PNEUMATIC AMPLIFIER

INVENTORS
LEO J. BERGER, JR. &
ROBERT W. CLAYTON
BY
Gregory S. Dolgorukov
ATTORNEY INVENTORS
LEO J. BERGER, JR. &
ROBERT W. CLAYTON
BY
Gregory S. Dolgorukov
ATTORNEY INVENTORS
LEO J. BERGER, JR. &
ROBERT W. CLAYTON
BY
Gregory S. Dolgorukov
ATTORNEY INVENTORS
LEO J. BERGER, JR. &
ROBERT W. CLAYTON
BY
Gregory S. Dolgorukov
ATTORNEY

PNEUMATIC AMPLIFIER

Original Filed July 25, 1962 5 Sheets-Sheet 5

INVENTORS
LEO J. BERGER, JR. &
ROBERT W. CLAYTON
BY
Gregory S. Dolgorukov
ATTORNEY United States Patent Office 3,387,619

Patented June 11, 1968

3,387,619

PNEUMATIC AMPLIFIER

Leo J. Berger, Jr., Farmington, and Robert W. Clayton, Pinkney, Mich., assignors to Scans Associates, Inc., Livonia, Mich., a corporation of Michigan Continuation of application Ser. No. 349,268, Mar. 4, 1964, which is a division of application Ser. No. 212,244, July 25, 1962, now Patent No. 3,248,931. This application Feb. 6, 1967, Ser. No. 614,360

3 Claims. (Cl. 137—86)

ABSTRACT OF THE DISCLOSURE

This application discloses an improved pneumatic amplifying device operable to respond to two pressure signals to sense the difference therebetween and to produce a modified pressure signal amplified in a predetermined degree in proportion to such sensed difference for the purpose of rendering said difference, which may be so small as not to be capable of causing by itself any compresensive response of measuring instruments, sufficiently strong to be evaluated by measuring such amplified signal. Amplification is attained by pneumatic means and degree of amplification can be controlled by manually adjustable means. Strict proportionality of amplification is attained by sensing first the difference between two unmodified original pressure signals and thereupon amplifying such difference, rather than by amplifying pressure signals first and thereupon attempting to produce some response to determine the difference between separately amplified original signals. Applicant's system greatly reduces the effect of various parasitic influences and errors and produces more reliable results.

This invention relates to pneumatic amplifiers, and more particularly to an improved pneumatic amplifier of the type commonly referred in the art as "differential pressure cells." The present application is a continuation of application Ser. No. 349,268 filed Mar. 4, 1964 now abandoned which is a division of our co-pending application filed on July 25, 1962, Ser. No. 212,244, now Patent No. 3,248,931 for Leak Testing System.

Testing systems of the above nature have now become not only necessary equipment for testing laboratories and departments but also a necessary portion of production installations or lines in which each such item is tested for leakage as a part of production inspection. Accordingly, the operation of such systems must keep pace with the rate of production, and the total time allowed for testing such parts, including those of considerable size and weight, may be limited to a few seconds only. Such "total time" includes both the time required to connect the part to the system as well as disconnect it, and the testing time itself. The actual testing consists of filling the hollow part with air bringing it to a predetermined pressure; disconnecting or shutting off the hollow part from the source of air supply, and measuring the drop of pressure within the part through the period of test time.

The difference between the pressures at the beginning of the test period and at the end thereof constitutes "drop in pressure" which is the measure of leakage in the part. Leakage may be an indication of faulty casting, improper materials, faulty machining, and similar causes, calling for rejecting the part. The amount of permissible leakage is a standard set by the manufacturer on the basis of experience and demands which the tested part must satisfy. Setting such a standard may be preceded by experimentation, operating on the basis of a tentatively set standard, analyzing field reports, etc. Changing a previously set standard often becomes necessary as a result of such work.

It should be understood that because of the shortness of the test period which, in some instances, may be limited to a few seconds only and to relatively small leakage occurring from the part during the test period, the difference between the starting and ending pressures may be so small that it is not susceptible of being measured by itself under conditions of production testing even with the most sensitive pressure gauges. Accordingly, leak testing systems generally utilize devices known in the art as "differential pressure cells," a number of makes of which are available on the market. The purpose of a differential pressure cell is to amplify such minute pressure drop within the part in such a manner that it can be read by a pressure indicating instrument on a scale of a substantial size and be indicated thereon in a positive manner, that is, to have the greatest drop in pressure cause the greatest rise of the indicating handle on the instrument. The undesirability of such a function of a "differential pressure cell" is well realized in the art; attaining such operation with the use of conventional devices proved to be difficult and involving a number of serious problems. Particularly, amplification of the responses has been attempted by way of mechanical means, such as by increasing the size of pressure responsive members, i.e. using larger diaphragms, or longer levers or rocking bars and the like, to attain mechanical advantage. We have found, however, that such mechanical expedients can be used only in a limited degree, since increasing the size of the pressure responsive members usually increases their weight and, therefore, inertia and interferes with responsiveness of the systems. Furthermore, the use of hinged levers or rocking bars, as well as adjusting means therefor inevitably involves friction disturbing the straight line relationship between the original and the amplified responses, with such disturbance increasing rapidly as the degree of amplifiaction is increased.

It will now be clear, in view of the foregoing, that a leak testing system in a plant may be set up and used for testing various parts to satisfy various specifications as far as leakage is concerned. For instance, certain parts may have to be tested to reject any such part showing leakage of more than .005" p.s.i. in 5 seconds. In the same plant certain other parts may be tested to reject any such part showing leakage of more than 15 pounds in 30 seconds, or 7,500 times as much as in the first example. It should be appreciated that with tests in the sensitivity range of .005"–.010" of a pound p.s.i., if possible at all, sensitivity of the instruments and testing regime must be of a highly developed character. In such tests changes in barometric pressure and/or ambient temperature may have a vital effect on the test results and may completely destroy the value of such tests by giving faulty indication calling for rejection of perfectly sound parts or passing faulty parts.

The range of sensitivity requirements presented to leak testing systems in their practical applications is so wide that it was found impractical to provide a system or installation capable of covering the entire range of such sensitivity requirements, and a relatively large number of units of varying degrees of sensitivity is usually offered to a customer for his selection.

As an improvement permitting retention of some basic components of a system and yet to cover the wide range of sensitivity requirements, some manufacturers have offered a number of "differential pressure cells," each adapted to cover a certain portion of the total sensitivity range. For instance, one manufacturer of such differential pressure cells" offers nine models of a certain type of "differential pressure cell" to cover a range of sensitivity from 4" of water to 400" of water. With 1" of water being equal to approximately .036 p.s.i., the above range is approximately .15 p.s.i. to 15 p.s.i. and is thus covered by nine models of the differential pressure cells of that particular make. In this connection it should be noted that some manufacturers do not even attempt to offer a differential pressure cell with a claim of covering any sensitivity ranges below .15 p.s.i., with such sensitivity being considered by those skilled in the art as impractical. This general understanding in the art is due to the reasons explained above, namely, that within the range of such high sensitivity the outside influences mentioned above affect the test results in a manner making it virtually impossible to maintain the system in operating order for any practical length of time and without the test results becoming not only virtually useless but misleading.

With a number of "differential pressure cells" available to cover the range of sensitivity that may be required from a system on various jobs, should it become necessary to move from one portion of such range to another, disassembling the system to insert therein a new "differential pressure cell" and a number of other components may border, in many instances, on rebuilding of the entire system. This requires considerable time and usually cannot be done by plant personnel but requires participation of an expert engineer from the leak test system manufacturer. The above condition involves not only considerable expense but emergency travel and connected consequences One of the objects of the present invention is to provide an improved leak testing system whereby the above difficulties and disadvantages are overcome and largely eliminated without introducing other problems or affecting appreciably the costs involved.

Another object of the invention is to provide an improved leak testing system including a device in the nature of a "differential pressure cell," which can be set for test purposes not only through the entire range of sensitivity such as .15 p.s.i. to 15 p.s.i. but for uncomparably greater sensitivity such as .005 p.s.i. and even greater, without the necessity of changing any components of the system but merely by adjusting the system in a simple and speedy manner, which is within the capability of the plant personnel using the system, and, therefore, eliminating the loss of time and expense connected with converting a conventional leak testing system for a test assignment outside of the range for which the "differential pressure cell" used therein is built.

A further object of the present invention is to provide an improved leak testing system which can be adjusted for test operation within an extremely high sensitivity range and which gives reliable results within such range unaffected by influences making results obtained from conventional systems unreliable due to the disturbing influences such as changes in barometric pressure and/or ambient temperature, turbulence of air within the part, cooling of the air within the part, and the like.

A still further object of the present invention is to provide a device which can perform in an improved manner the functions of conventional differential pressure cells particularly but not exclusively with leak testing systems and which can be used to advantage.

A still further object of the invention is to provide an improved pneumatic amplifier in which amplification is attained by pneumatic means, and in which amplification by the use of mechanical means such as by increasing the size of pressure responsive members, securing mechanical advantage by the use of hinged or otherwise supported levers, the use of flappers, exposed nozzles, and similar expedients involving an increase of weight and friction interfering with proportionally or straight line relationship between the original and the amplified responses, and presenting danger of interference with the operation of breakage of exposed parts, are eliminated, producing a fully enclosed, compact, and more reliable device.

A still further object of the present invention is to provide an improved pneumatic amplifier in which both the amplifier means and the "response reversing" means, i.e. means producing pressure rise instead of pressure drop, are of the pneumatic type.

A still further object of the present invention is to provide an improved leak testing system using a pneumatic pressure amplifier and a pressure indicating device which system is less sensitive to fluctuation of the test pressure than are conventional leak testing systems.

A still further object of the present invention is to provide an improved pneumatic amplifier not only making it possible to attain an exceedingly high degree of adjustable amplification but also attaining adjustments of degree of amplification with the aid of purely pneumatic, i.e. pressure responsive means, and without the use of mechanical expedients and, therefore, retaining the straight line relationship between the original and the amplified responses throughout the entire range of amplification adjustments.

A still further object of the present invention is to provide an improved leak testing system including a pressure indicating device used in combination with an improved pressure amplifier disclosed herein, whereby the system operates in response to the drop of pressure within the part from the actual pressure existing within the part at the beginning of each test period rather than from a certain pressure presumed to exist within the part at the start of the test period but, in fact, varying within a considerable range because of a number of disturbing influences.

A still further object of the present invention is to provide an improved leak testing system having improved construction whereby the total volume the leakage from which determines the test results is as small as it is possible to have without adversely affecting the constructive requirements of the device, whereby the volume added to the hollow of the tested part for the purposes of testing or "parasitic" volume is decreased to a minimum and, therefore, does not affect in an appreciable measure the accuracy of the test measurements.

A still further object of the invention is to provide a leak testing system of the nature specified above, which system because of the combination of the components specified above automatically enables the operator to find leakage resulting is a pressure drop of only .01" of water and with accuracy readings plus minus .02" of water.

It is an added object of the present invention to provide an improved leak testing system which is relatively simple in construction, dependable in operation, relatively inexpensive to manufacture, easy to reset for testing assignments within a wide range of sensitivity specifications, and which is otherwise easy to service.

Further objects and advantages of this invention will be apparent from the following description and appended claims, reference being had to the accompanying drawings forming a part of this specification, wherein like reference characters designate corresponding parts in the several views.

Figures 1, 3:
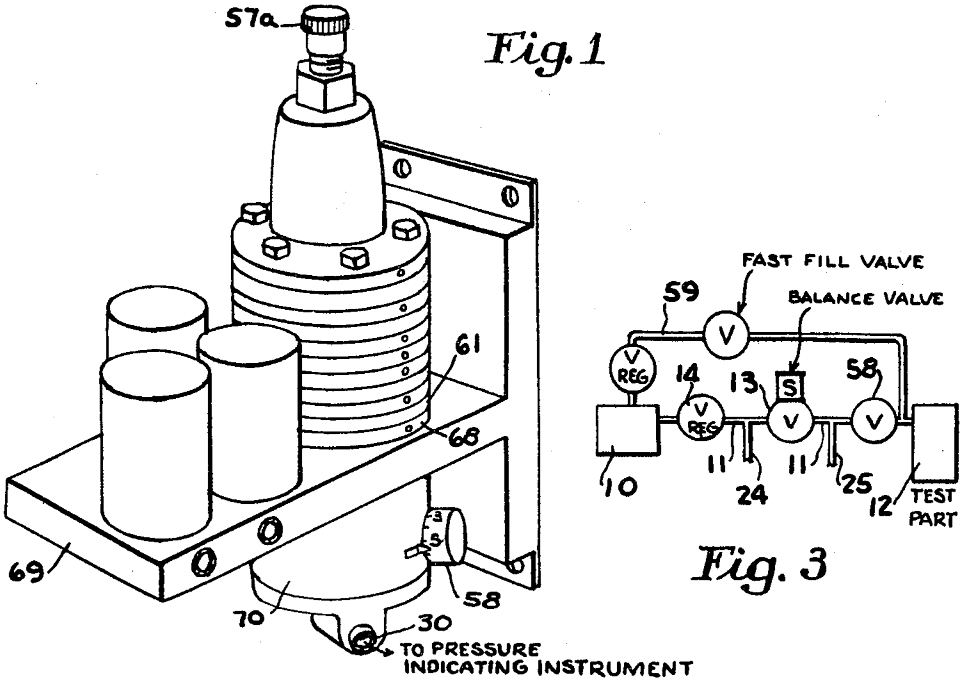
FIG. 1 is a perspective view illustrating our improved pneumatic amplifier assembled on a suporting bracket as a part of the leak testing system, with said bracket also supporting other components of the system.
FIG. 3 is a fragmentary diagrammatical view showing some additional devices inserted in the conduit connecting the source of pressure with the test part. which devices are included in leak testing systems for more efficient operation thereof but which have been omitted in FIG. 2 for clarity of the diagram of FIG. 2.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

The leakage testing system disclosed herein is used primarily for the purposes of indicating the rate of leakage in tested parts, such as in automobile cylinder blocks or other hollow castings, riveted or welded tanks, tubeless tires and/or their mounting means, and the like. The degree or rate of leakage from the hollows or cavities of such parts is usually used as an indication of their quality, such as soundness of castings or of the welded seams, tightness of riveted joints, and even porosity of the metal itself. It should be appreciated that in many instances the leakage indicating a defective part may, nevertheless, be so small within the duration of the period allowable in quantity production, where speed may be of the essence of practicability, that the existing pressure-indicating instruments may not be capable of giving any readable indication of the change in pressure.

Nevertheless, such leakage, while appearing exceedingly small for the purposes of measuring, may be very substantial when considered in view of proper functioning of the part. For instance, a pressure drop from an automobile tire of 1 lb. in 24 hours is objectionable since it would require checking tires each 3 or 4 days. However, when it is realized that in a period of 10 seconds, the same drop is manifested by a drop of pressure only slightly above .0001 p.s.i., the difficulties of measuring such drop can be better appreciated. It is because of these difficulties that provision of an amplifier device of proper construction and its proper operation is of critical importance in leak testing systems. Accordingly, the effectiveness and reliability of such systems depend very largely on the construction and operation of such amplifier device.

It will now be clear in view of the foregoing that one of the most important requirements of a leak testing system resides in its sensitivity. Our improved system disclosed herein not only has sensitivity greatly superior to that of conventional systems, but is also made adjustable through the entire range of sensitivity requirements met in industrial operations. Accordingly, our improved system may be used in a greater variety of industrial and laboratory applications than conventional systems. In addition, our improved system includes amplifier means so constructed that the high degree of amplification does not appreciably disturb the proportionality thereof to the primary response by factors such as friction, weight, inertia, and by other parasitic influences that may completely destroy the reliability of measurements even with a relatively small degree of amplification.

In the drawings there is shown, by way of example, a leaking testing system embodying the present invention. For the purposes of clarity and ease of following more detailed descriptions, the general or basic organization of our improved system and its operative elements are indicated in FIG. 1 wherein one such system is illustrated, exclusive of its electrical part.

Figure 2:
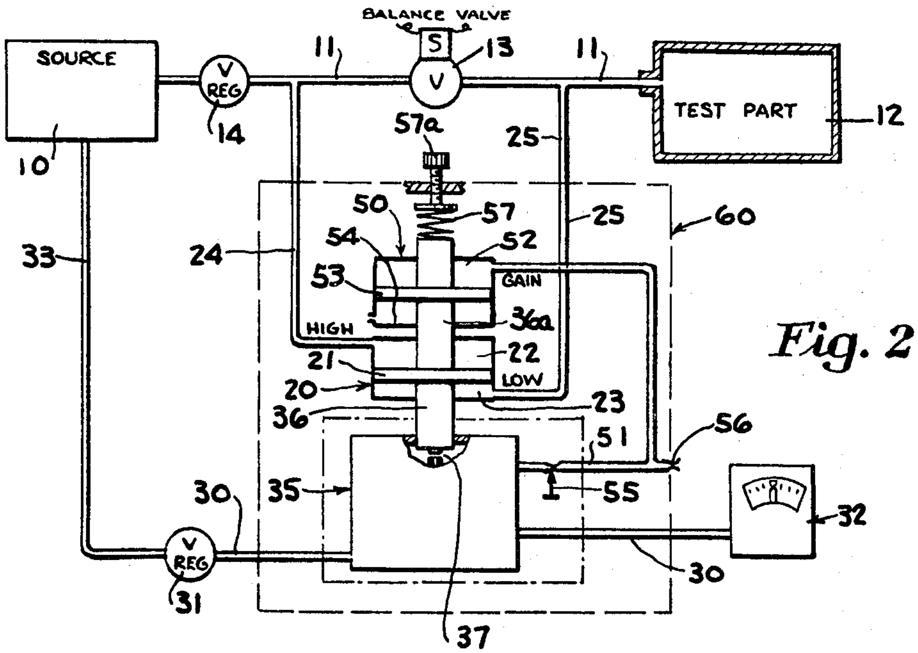
FIG. 2 is a diagrammatic view showing our improved leak testing system.

Referring to FIG. 2, the system illustrated therein comprises a source of pressure generally designated by the numeral 10 connected with the aid of a primary conduit means 11 with a hollow of a tested part 12 to provide communication therebetween. Within said primary conduit means 11 there is operatively interposed valve means 13 for interrupting the communication between said source 10 and the tested part 12. A pressure regulator such as 14 may be provided at the intake end of the conduit 11 for the purpose of regulating the test pressure supplied to the test part 12 and maintaining such test pressure at a predetermined point, such as 10 p.s.i. Primary pressure responsive means, generally designated by the numeral 20, include a pressure responsive member 21 of any desirable character which member divides the chamber in which it operates into a high pressure side 22 and a lower pressure side 23. The high pressure side 22 of the primary pressure responsive means 20 is connected to the source 10 with the aid of the conduit 24, while the low pressure side 23 of the primary responsive means 20 is connected with the hollow or cavity of the test part 12 with the aid of a conduit 25 as shown in FIG. 2. Such connection may be effected by connecting the high pressure side 22 with conduit 11 on the source side of the valve 13, while the low pressure side 23 is connected with said conduit 11 on the test part side of said valve 13. If the regulator of the test pressure, such as 14, is provided, the conduit 24 is connected to the conduit 11 between said regulator and the valve 13.

It will now be seen in view of the foregoing that when the valve 13 is open, the test pressure in the magnitude determined by setting of the regulator 14 is transmitted to the hollow of the test part 12 and through conduits 24 and 25 to the high pressure side 22 and to the low pressure side 23, respectively, of the primary responsive means 20. Under such conditions, as long as the valve 13 remains open, the pressure within the test part 12, the high pressure side 22, and the low pressure side 23 of the primary pressure responsive means 20 will be equal and, therefore, the member 21 will remain in balanced condition and will remain stationary. Under such conditions, any leakage from the hollow of the test part 12 is immediately compensated by the source 10 through the regulator 14 and will not affect the balance of the system.

On the other hand, as soon as the valve 13 is closed, which may be done manually or automatically with the aid of a suitable solenoid controlled by a timer mechanism for automatic operation, leakage from the hollow of the test part 12 will cause a certain pressure drop within said hollow. Now, such drop cannot be compensated for by the source 10 because of interruption of the primary conduit 11 by the valve 13, and, therefore, pressure within the test part will continue to decrease during the entire test period. Under such conditions, while the pressure on the high pressure side 22 of the primary pressure means 20 will remain as determined by the regulator 14, the decrease in pressure in the test part cavity will cause a drop in pressure also on the low pressure side 23 of the primary responsive means.

It should be appreciated at this point that no leakage may be presumed to take part in the conduit 25 and the conduit 11 between valve 13 and test part 12 and, therefore, the drop in pressure because of leakage from the test part 12 will be modified or decreased only by the effect of the volume of the conduit 11 between the valve 13 and test part 12, as well as of the volume of conduit 25 and of the low pressure side 23 of the primary responsive means 20. This volume may be termed "parasitic volume," since it is undesirable. The smaller is this volume, the smaller will be its effect on the pressure drop in the test part 12. In our improved system parasitic volume in the primary portion of the system, as well as in the other portions thereof described later, is reduced to its minimum, thus ensuring that the response of the system is not adversely modified by the parasitic volume thereof.

Under the condition described above due to the difference in pressure on the sides 22 and 23 of the primary pressure responsive means 20, the pressure responsive member 21 thereof becomes unbalanced and will tend to move in the direction of the lower pressure. However, because of the exceedingly small drop in pressure that may occur within the test part because of the short duration of the test period, which drop may be as small as .005 lb. p.s.i. this drop of pressure cannot be properly indicated and read on the existing pressure indicating instruments. In order to be read on such instruments, it must be amplified many times.

In the present embodiment of the invention, such amplification is attained in our system by pneumatic means comprising a secondary conduit means 30 connected to a source of regulated pressure, such as a regulator 31, on its intake side, and to the pressure indicating instrument 32 on its output side. The pressure regulator 31 may be connected to the same source 10, such as with the use of conduit 33, or it may be connected to an entirely separate source. It is of importance that pressure within the secondary conduit 30 be uniform or constant without any appreciable fluctuations thereof.

Within the secondary conduit means 30 there is operatively mounted control means, such as those indicated at 35 and including a variable restrictive opening governed by the primary responsive means 20 through the member 36 actuated by the member 21 of said means. Presuming for clarity of illustration that the test pressure in the part 12 supplied from the source 10 through the regulator 14 and the valve 13 is 10 p.s.i. and that such pressure after closing the valve 13 dropped .005 p.s.i., within the test part 12 and the low side 23 of the means 20, it will be seen that such drop in pressure cannot be measured by itself. However, such drop in pressure may, nevertheless, provide a sufficient force to actuate the member 21, and through the member 36, the control means 35 to affect appreciably the pressure existing in the secondary conduit 30 between control means 35 and instrument 32.

In the present embodiment of the invention the means 35 are effective to amplify the response of the primary means 20 and to convert the drop in pressure into a pressure rise, i.e. to make the response measured by the pressure indicating instrument inversely proportional to the drop of pressure in the primary responsive means.

Furthermore, it should be understood at this point that with the system so far described it is possible to measure pressure leaks not only with very little degree of amplification but within a relatively narrow range of leak rate variations. If a system is constructed for industrial applications where the tested parts can have a medium amount of leakage, the system would have sufficient visual response on its pressure indicating device only if used within the medium range of leakage. However, when such system is used for applications where the test part can have relatively large leakage, its response may be too large for the instrument scale, even if the duration of the test period and regulated pressure in the conduit 30 are modified to suit the new condition. Similarly, in industrial applications where the tested part has an exceedingly small leakage, the system would not be sufficiently sensitive, even if the regulated pressure is correspondingly adjusted and the duration of the test period is increased to its permissible maximum. Accordingly, in the prior art as many as eight models of systems have been offered to cover the commonly encountered test conditions.

In accordance with the present invention we have completely discarded such constructions and provided a single system which by means of a simple adjustment is made useable for any portion of the entire range of practical sensitivity requirements formerly covered by a relatively large number of models as mentioned above. In accordance with the present invention we provide an improved means whereby the system which in its part so far described is constructed to be suitable for industrial test applications is suitable for use under conditions in which the tested part has the greatest leakage normally encountered. The improved means are provided to increase adjustably the sensitivity of the system to the highest practicable degree and thus is made applicable for testing parts having leakage so small that conventional systems capable of measuring coarse leakage could not respond to it, or if adjusted in their mechanical means would seriously impair proportionality of the response.

In the present embodiment of the invention such means are represented by the "third order" or supplementary means adapted to enhance or to amplify the original response of the primary pressure responsive means through the response of the secondary conduit 30 between control means 35 and instrument 32. The increased response of the primary means, in turn, increases the original response and brings it to a new balance that is registered by the pressure indicating instrument 32. Such "cascading" or progressive increase of response ensures production of a signal under conditions of exceedingly fine measurement. In the present embodiment of the invention said means are exemplified by a third order or supplemental conduit 51 connecting the conduit 30 on the instrument or delivery side thereof with the high pressure side 52 of the third order of supplementary pressure responsive means generally designated by the numeral 50 to actuate the pressure responsive member 53 thereof connected to the upper portion 36*a* of the member 36 which, in turn, is connected to the member 21 of the primary responsive means 20. The other side 54 of said supplementary means 50 may be open or vented to the atmosphere. When the primary means 20 actuate the means 35 to produce in the instrument side of the conduit 30 an increased response, namely, some rise in pressure, such rise acting through the conduit 51 to the extent permitted by the adjustment valve 55 acts on the member 53 of the supplementary means 50 and through the members 36*a* and 36 on the means 35, increasing still further the response within the conduit 30 to be measured by the instrument 32.

The sensitivity adjustment valve 55, which in the embodiment illustrated herein is manually adjustable, is provided within the conduit 51 to regulate the amplifying function of said supplementary pressure responsive means 50 from zero to built-in maximum. Thus, with the adjustment valve 55 being closed, this system is used for industrial applications wherein the tested part has a high leakage easily measured. For greater sensitivities, the adjustment valve 55 is manually adjusted or opened to any desired degree, to increase sensitivity of the entire system, as its application requires, to its most sensitive operation. The conduit 51 between the valve 55 and the pressure responsive means 50 is vented to the atmosphere as indicated at 56 to ensure flow within the conduit 51. Spring means 57 are provided in the supplementary responsive means 50 to act on the member 36*a* thereof, such action being adjustable with the aid of an adjustment knob 57*a* acting through the shaft 88. By adjusting the force exerted by the spring 57 on the member 36*a*, the system may be adjusted to have in the balanced condition thereof the zero reading on the pressure indicating instrument. Some additional devices may be included in the system illustrated in FIG. 2, for the purposes of more efficient operation. As shown in FIG. 3, such devices are exemplified by the test valve 58 provided in the conduit 11 for closing the same when the test part 12 is being removed and disconnected from the system, and the new part is being connected thereto. Also, in order to speed up tests under production conditions, a "fast fill" line 59 is provided to connect the source of pressure 10 with the test part 12 and to enable the operator to fill the cavity of the test part faster than it could be done through the conduit 11, and to protect the delicate parts of the system. While these and other expedients are important for the operation of leak testing systems, they do not by themselves form a part of this invention, and, therefore, their showing in FIG. 2 is omitted to prevent complicating the diagram intended to illustrate the invention in the simplest possible manner.

In accordance with the invention we provide an improved pneumatic amplifier which includes within its physical structure a number of portions of the system shown diagrammatically in FIG. 2, and particularly the primary responsive means such as 20; the secondary conduit means, such as 30; the control means 35; the supplementary pressure responsive means, such as 50; together with the conduit means 51 and the sensitivity adjustment valve 55 thereof. The portion of the system illustrated in FIG. 2 included in the physical structure of the pneumatic amplifier is circumscribed in FIG. 2 with the dotted line rectangle designated by the numeral 60. In addition, said pneumatic amplifier, as illustrated in FIG. 4, includes a number of additional means intended to make responses of the operative parts of the system free of erratic behavior or variations, and to produce steady and reliable responses retaining proportionality to responses of the primary responsive means.

Figure 4:
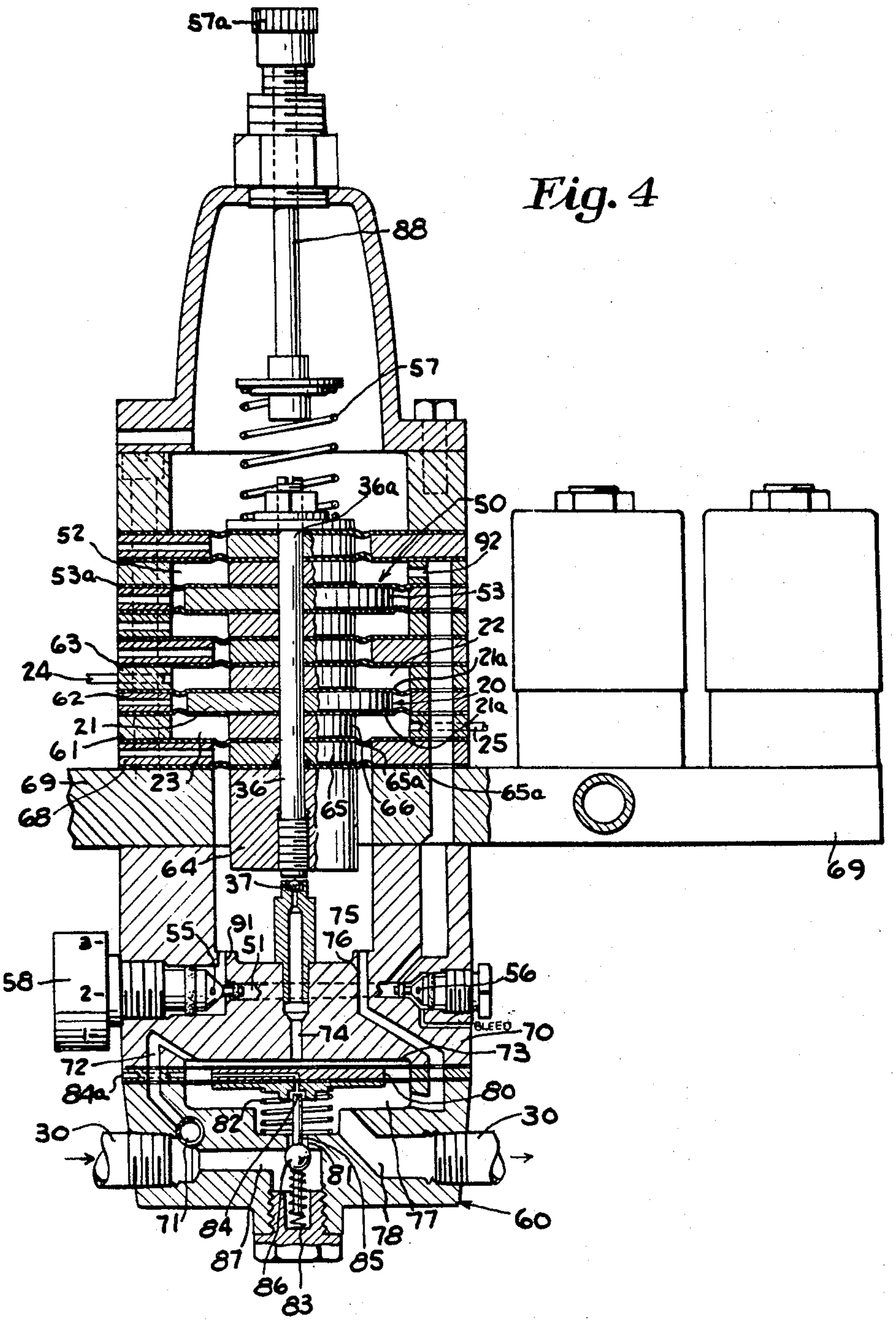
FIG. 4 is a sectional view illustrating the construction and operation of our improved pneumatic amplifier or a differential pressure cell.

Such pressure amplifier is illustrated in FIG. 4 in its physical embodiment wherein it is generally designated by the numeral 60. Referring to said FIG. 4 the primary responsive means thereof include the diaphragm member 21 in the form of a flat disc sandwiched between two rubber membranes **21*a* with the outer peripheries of said membranes held between the rings 61, 62, and 63 forming a portion of the pneumatic amplifier. The member 36 of the primary pressure responsive means is in the form of a shaft extending through the center of the disc 21 and protruding upwardly and downwardly therefrom. At its lower end the shaft 36 is secured to a cylindrical block 64. The spacer members 65 and 66 are provided on the lower end of said shaft 36 between the extremity thereof and the member 21. The lower member 65 is sandwiched between the two rubber diaphragms 65*a*. The outer periphery of the upper diaphragm 65*a* is held between the rings 61 and 68, while the lower diaphragm 65*a* is held between the ring 68 and the frame plate 69 on which the amplifier is assembled. By virtue of such construction the high pressure side 22 and the low pressure side 23 of the primary responsive means are thus defined within the amplified structure, and the member or shaft 36 is mounted for vertical movements therein in response to the difference in pressure within the high pressure side 22 and the low pressure side 23, acting on the member 21. Thus, our improved amplifier includes, in effect, three wall members forming two adjacent chambers within which are operatively disposed diaphragm members 21 and 53. The peripheral portions of the wall members are secured within the housing of the amplifier, while their middle portions are resiliently mounted for movements with the shaft 36**, i.e. with the entire stack.

The secondary conduit 30 is exemplified by the pipe line leading into the lower lefthand portion of the amplifier and continuing on the other side thereof, with a number of hollows and conduits formed in the lower body portion 70 of the amplifier forming a part thereof. Said articulated secondary conduit 30 includes within the body of the amplifier a constant restrictive orifice 71, a conduit 72, a pressure chamber 73, a conduit 74, control orifice 37, a main body cavity 75, a conduit 76, a chamber 77, and a conduit 78 from which the conduit 30 extends for connection with the pressure indicating instrument 32. Thus, the air under pressure from the regulator 31 enters the amplifier through the conduit 30 at the lefthand side (in FIG. 4) thereof; flows through the lower portion thereof and proceeds from the righthand side extension of the conduit 30 provided on the righthand side of the bottom of the device to the pressure indicating instrument.

The control orifice 37 interposed between the conduit 74 and the main body cavity 75 is governed by the primary pressure responsive means through the shaft 36. As the member 21 and its shaft 36 move downwardly in response to the greater pressure within the high pressure side 22, the end of the shaft 36 comes closer to the orifice 37 and restricts the flow therethrough in proportion to the response of said member 21.

The diaphragm made in the form of a disc 80 and sandwiched between two rubber membranes is mounted within a hollow in the lower portion of the body of the amplifier and divides said hollow into chambers 73 and 77 mentioned above. A diaphragm spring 82 is provided within the chamber 77 to act on the lower side of the diaphragm disc 80 for the purposes explained below. A conduit 81 leads from the bypass conduit 87 into the chamber 77. It includes a valve seat which is normally closed by a ball valve 86 mounted on a shaft 85, with a ball valve spring 83 being provided to ensure such closing. The upper portion of the shaft 85 forms a needle valve 84 which is normally closed but which, when open, permits leakage of the fluid from the chamber 77 into the atmosphere through the vent **84*a***.

The air regulated to a uniform pressure such as 25 p.s.i. enters the amplifier at the lefthand lower portion thereof through the conduit 30 and passing through the constant restrictive orifice 71 enters the chamber 73 on the upper side of the diaphragm 80 at a reduced presssure, such as 4 p.s.i., because of the action of said restrictive orifice 71. This lower pressure is effective to act on the upper side of the diaphragm 80. Proceeding further through the conduit 74 the air passes through the restricted opening of the control orifice 37 and enters the main body cavity 75 at a still lower pressure such as 3 p.s.i. because of the restrictive action of the control orifice 37. From the main body cavity 75 the air under pressure flows through the conduit 76 into the lower chamber 77 and through the conduit 78 into the conduit 30 at the righthand lower portion of the amplifier.

When the pressure within the chambers 22 and 23 of the primary responsive means is equal, the system is substantially in balance and the pressure acting on the diaphragm 80 differs only by the amount of drop through the control orifice 37, in the example given by 1 p.s.i. One function of the diaphragm spring 82 is to compensate for the above difference in pressure and to oppose the tendency of the diaphragm 80 to move down. Thus, the system is in balance. The pressure of 3 p.s.i. acting within the chamber 77 is also acting through the righthand portion of the conduit 30 on the pressure responsive instrument 32 which is constructed to indicate the starting point or reference pressure. Means are provided to permit closer adjustment of the reading in the pressure responsive instrument 32 to such reference or starting point by the provision of the upper adjusting spring 57. Provision of this adjustment is intended to compensate for the force produced by pressure such as 3 p.s.i. within the main body cavity 75 acting on the cylindrical block 64 forming the bottom of the stack, which tends to force the shaft 36 upward. To compensate for such pressure force the upper spring 57 adjustable by rotating the knob **57*a*** is provided for such purpose, as mentioned.

In the use of the amplifier, decrease of pressure in the low pressure side or chamber 23 of the primary responsive means due to the leakage of the test part causes the member 21 and its shaft 36 to move downward. In consequence thereof the control orifice 37 narrows causing a higher pressure drop through the control orifice 37. However, at the same time the pressure within the chamber 73 and conduit 74, i.e. between the orifices 71 and 37, increases, causing the diaphragm 80 to move downwardly. In its downward movement, the diaphragm actuates the shaft 85 of the ball valve 86, unseating said valve and allowing the regulated supply pressure to pass through the conduit 87 and 81 directly into the chamber 77, i.e. bypassing the orifice 71, causing a new higher pressure to act on the bottom side of the diaphragm 80, thus bringing the system to a new balance at a higher pressure, and with such higher pressure within the chamber 77 being conveyed through the righthand side of the conduit 30 to the pressure indicating instrument 32.

It will now be seen that a drop in pressure in the primary responsive means has been converted by the action of the control diaphragm 80 and its adjusted means described above to a pressure rise acting on the instrument 32. It should be understood, however, that while such conversion is attained, no substantial amplification has been attained by the pneumatic amplifier, as so far described. Any amplification attainable in the system so far described would have to be produced by mechanical expedients such as utilizing levers and similar expedients having the serious disadvantages explained above. It would also be possible to produce a greater force on the shaft 36 by increasing the effective area of the primary responsive means. However, such increase would not be an amplification of the response between the primary responsive means and the instrument but merely increasing the original response of said primary pressure responsive means.

In accordance with the invention we provide an exceedingly simple and effective pneumatic means operating to produce amplification of the response of the primary means without increasing the effective area and the weight thereof, increasing friction and inertia and producing other undesirable consequences. We provide supplementary pressure responsive means 50 generally described with reference to FIG. 1. Said means are exemplified in the construction of FIG. 4 by the port 91 leading into the conduit 51 and through port 92 into the high pressure side of chamber 52. A disc 53 sandwiched between rubber membranes 53*a* is a pressure responsive member of said means, and it also forms a part of the "stack." Between ports 91 and 92 there is provided a sensitivity adjustment valve 55 adapted to interrupt communication between said ports or to open it to the full capacity. The disc 53 is secured to the upper portion 36*a* of the shaft 36.

When the sensitivity adjusting valve 55 is open, pressure from the main body cavity 75 is conveyed, in the degree permitted by said valve 55, through the conduit 51 into the chamber 52 producing a force acting through the shaft 36 on the restrictive control orifice 37, aiding the primary pressure responsive means. The control movements of the member 36 are thus aided by the disc 53, are thus made stronger, amplifying the original response of the primary pressure responsive means. A greater pressure rise is then caused within the chamber 73, a still lower drop in the chamber 77 and more resolute downward movement of the diaphragm 80. Regulated pressure entering through the conduits 87 and 81 because of unseating of the ball valve 86 now has to balance a higher force produced by the amplified action of the primary responsive means. A higher pressure so produced is transferred from the chamber 77, through conduits 78 and 30 to the pressure responsive instrument 32. A new higher signal pressure is thus indicated by the pressure indicating instrument 32. The valve 55 which may be adjusted from complete interruption of communication between the ports 91 and 92 to its full opening thus provides means for adjusting the degree of amplification produced by the system, and, therefore, the degree of its sensitivity. The more restricted is the flow by closing the valve 55, the less amplification or gain will be produced by supplementary pressure responsive means 50. Complete closing of the valve 55 will decrease such amplification or gain to zero. A full opening of the valve 55 would increase such amplification to its maximum producing greater sensitivity attainable by the system.

The function of the needle valve 84 is to vent the pressure that may exist in the chambers 77 and 78 to the atmosphere and thus enable the system to return to its original balance after the expiration of the test period. Atmospheric bleed orifice 56 is provided in the conduit 51 on the up stream side from the sensitivity adjustment valve 55 to maintain flow across valve 55 to allow valve 55 to produce a controlled drop therethrough. It will also be seen that the entire "stack" including the pressure responsive elements 21 and 53 together with their spacer members and the shaft 36 is movable as a unit within the upper portion of the amplifier, the outer wall whereof is formed by the rings connected together with suitable bolts or screws to form a unitary construction. The stack, thus, in effect, floats within the amplifier, being mounted therein with a plurality of circular rubber membranes.

The entire device is supported on the frame plate 69. The plate 69 may also be secured to a bracket for mounting the amplifier on a supporting wall or member and may be extended on the other side to carry portions of the system in which the amplifier is utilized such as various valves, portions of the electrical system, and the like. FIG. 1 illustrates such method of mounting the amplifier used as a part of a leak testing system.

Figure 5:
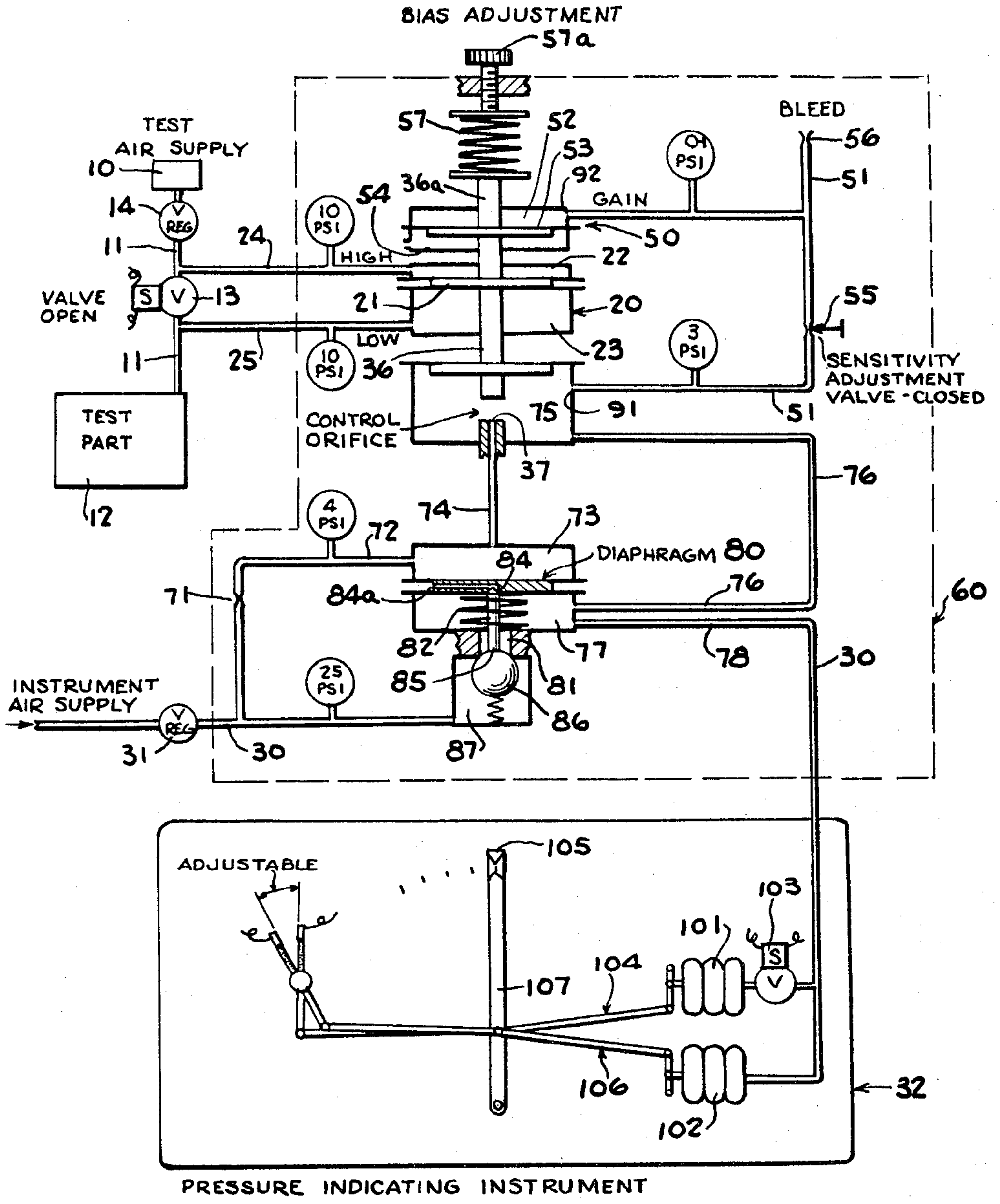
FIG. 5 is another diagrammatic view similar to FIG. 2 but showing our improved leak testing system on an enlarged scale and in greater detail, with the system being shown in balanced condition such as at the beginning of the test period.
Figure 6:
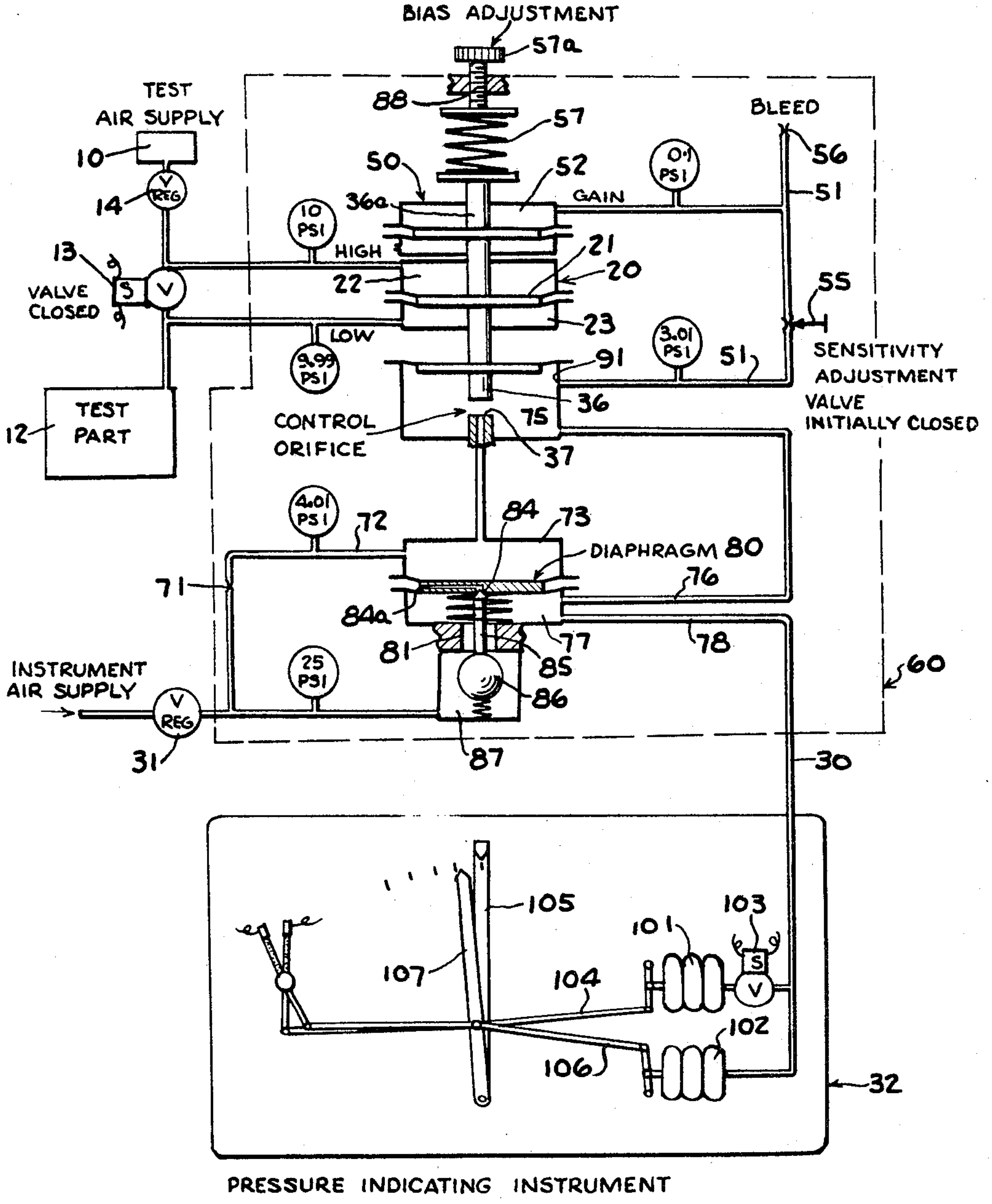
FIG. 6 is a view similar in part to FIG. 5 but showing the same system registering a leak from the test part cavity or hollow without the aid of the gain control means, said means being taken out of operation by closing the gain control valve.
Figure 7:
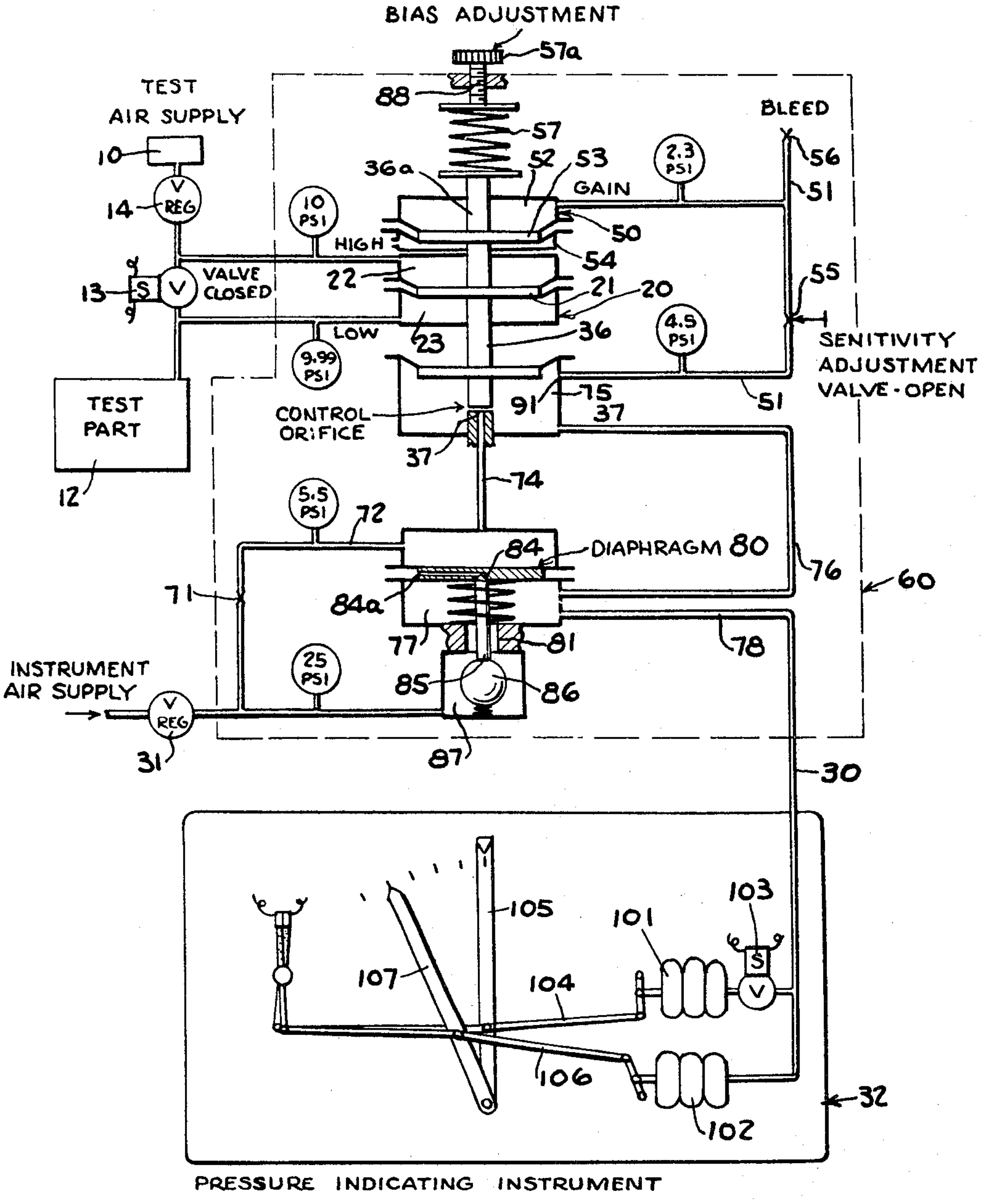
FIG. 7 is a view of the system of FIG. 6 indicating a leak in the tested part of the same magnitude as in FIG. 5, but with the pressure indicating device responding thereto in a greatly amplified manner because of opening of the gain control valve.

The construction of the pneumatic amplifier having thus been described in detail, FIGS. 5, 6, and 7 may now be more easily understood. In said figures, including showing in a diagrammatic manner additional means provided in the amplifier for beter operation, three sets of operative conditions are illustrated. In these illustrative diagrams it is presumed, by way of example, that the parts are tested with a test pressure of 10 p.s.i., with leakage during the test period of 10 seconds duration being .01 p.s.i., the regulated pressure in the secondary conduit means supplied from the regulator 31 being presumed to be 25 lbs.

In FIG. 5 the system is shown at the start of the test period. Under such conditions the valve 13 is open and the pressure within the chambers 22 and 23 conveyed thereto by conduits 24 and 25, respectively, is 10 p.s.i. and is equal. The shaft 36 of the primary responsive pressure means 20 remains in its balanced position, providing no added restriction at the orifice 37.

The regulated pressure supplied to the amplifier at 25 p.s.i. through the lefthand portion of the conduit 30 extends in that magnitude into the chamber 87 under the ball valve 86 which is closed, and in passing through the constant orifice 71 drops to 4 p.s.i. which pressure acts on the top of the diaphragm 80, i.e. within the chamber 73. In passing through the control orifice 37, said pressure drops to 3 p.s.i. because of the restrictive effect of said orifice. The pressure of 3 p.s.i. is transmitted through the conduit 76 into the chamber 77 and acts on the lower side of the diaphragm 80. The difference of 1 p.s.i. acting on the diaphragm 80 is compensated by the diaphragm spring 82, thus keeping the system in balance. The pressure of 3 p.s.i. existing in the chamber 77 is transmitted through the conduit 78 to the righthand portion of conduit 30 connected to the bellows 101 and 102 and acting on said bellows. With the valve 103 being open, the same pressure of 3 p.s.i. exists within both of said bellows. The bellows 101 is connected through the linkage generally designated 104 with the reference pressure indicating hand 105, while the bellows 102 are connected with the linkage generally designated by the numeral 106 with the measured pressure indicating hand 107. The linkages 104 and 106 are so constructed that with the equal pressure acting within the bellows 101 and 102 said hands 105 and 107 are in registry at a certain starting point. In the improved pressure indicating instrument used in our system, the starting point depends on the actual pressure acting within said bellows. This and other features of construction and operation of the pressure indicating instrument 32 used in our system is disclosed in detail in said co-pending application, and no detailed description thereof is deemed necessary herein.

FIGS. 6 and 7 show the operation of the system resulting from the leak of the test part in the amount of .01 p.s.i. FIG. 6 illustrates the operation of the system without the action of the supplementary pressure responsive means, i.e. without increasing sensitivity of the system, such as with valve 55 being fully closed. FIG. 7 shows amplification of the response and of the sensitivity of the system due to the operation of the supplementary responsive means, i.e. in the condition when the valve 55 is open.

As the pressure within the low side 23 of the primary responsive means 20 drops to 9.99 p.s.i., the difference of pressure of .01 p.s.i. acting on the member 21 causes the member 36 to move against the control orifice 37 and, acting against its discharge, to increase its restrictive function. Such action of the member 36 on the control orifice 37 causes a rise of pressure between the restrictive orifice 71 and control orifice 37 which now may be taken to be 4.1 p.s.i. While at the same time the pressure within the chamber 75 would tend to decrease, this decrease would be immediately counteracted in the following manner. The increase of pressure within hte chamber 73 acting on the top of the diaphragm 80 would cause said diaphragm to move downwardly and to unseat the ball valve 86 permitting the pressure of 25 p.s.i. existing within the chamber 87 to be transmitted through the conduit 81 to cause a flow of air through the conduit 81, increasing the pressure within the chamber 77, causing the diaphragm 80 to return to its original position, with pressure within the chamber 77 and, therefore, within the portion of the conducit 30 connected to the pressure indicating instrument 32 to come to a higher value, such as 3.01 p.s.i. If the sensitivity adjusting valve 55 is closed, the system will come to a new balance at the pressure of 3.01 p.s.i. This pressure will be transmitted through the conduit 78 and the righthand portion of the conduit 30 to said instrument 32. At that time the control valve 103 of the instrument will be closed by operation of automatic electric means retaining therein its original pressure of 3 p.s.i. with the bellows 101, while the increased pressure of 3.01 p.s.i. acting within the bellows 102 will cause the linkage thereof to move the indicating hand 107 to the left. Since the reference pressure indicating hand 105 will remain in place, movement of the hand 107 will be caused by proportionately the same difference of pressure as that existing in the primary pressure responsive means, except that the drop of pressure has been converted by the action of the diaphragm and its connected means into the corresponding pressure rise.

It will be clear that under the conditions described above the movement of the measured pressure indicating hand 107 will be only very slight and the system would be useable only for relatively coarse leakage, i.e. leaks of considerable magnitude, such as several inches of water during the test period. FIG. 6 illustrates such a condition.

Presuming now that the sensitivity adjustment valve was open at the beinning of the test, the operation of the system will be modified and its original or basic response will be greatly amplified by the operation of the supplementary pressure responsive means 50. Under such conditions, the pressure on the high and low side of the primary responsive means 20 will be the same as under the condition described in FIG. 6 and the drop in pressure will be the same, i.e. .01 p.s.i. The operation of the system would tend to start as illustrated in FIG. 6 tending to give original response and pressure values throughout the parts of the system such as indicated in FIG. 6. However, because of the opening of the sensitivity adjustment valve 55, the pressure of 3 p.s.i. originally existing within the main body cavity 75 is metered through the valve 55 and is conveyed by the conduit 51 to the high pressure side of the supplementary pressure responsive means 50, exerting force on the member 53 and, therefore, on the member 36, tending to move it downwardly against the control orifice 37. Presuming that because of the restrictive effect of the sensitivity adjustment valve 55 pressure of 1 p.s.i. is transmitted to act on the member 53, and that the area of said member 53 is equal to that of the member 21, an additional force 100 times as large as that produced by the primary responsive means is added to the shaft 36. Now said shaft 36 would tend to act as if the pressure drop in the primary means 20 due to leakage in the tested parts was 100 times as large. Accordingly, the shaft 36 moves closer to the control orifice 37 increasing its restrictive effect in a greatly amplified manner.

In consequence thereof and virtually simultaneously therewith pressure between the orifices 71 and 37 is increased to a value greater than 4 p.s.i. and, for example, may reach 5.50 p.s.i. Such increased pressure acting on the top of the diaphragm 80 moves it downward in a more resolute manner, opening the ball valve 86 still further. The 25 p.s.i. pressure within the chamber 87 enters the chamber 77 under the diaphragm through a larger opening, producing a greater pressure therein, which pressure is conveyed by the conduit 76 into the main body cavity 75 counteracting the original tendency of pressure therein to drop because of the greater restriction of the control orifice 37. Pressure within the main body cavity 75 may now be presumed, for the sake of example, to increase to 4.5 p.s.i. Such pressure passing through the conduit 51 and dropping to some extent through the sensitivity adjustment valve 55 reaches the supplementary responsive means 50 increased to pressure such as 2.3 p.s.i., thus adding still more to the fore actiong on the member 36. Now we have the force acting on said member 36 which is 230 times as great as that produced by the original drop of .01 p.s.i., with the system coming to a balance under such conditions. The increased pressure within the chamber 77 under the diaphragm 80 is transmitted through the conduit 78 and the righthand side of the conduit 30 to the bellows 102 causing greater response thereof and movement of the measured pressure indicating hand 107 to a position indicating much greater response more easily read on the pressure indicating instrument scale. The increase of the response of the pressure indicating instrument 32 although greatly amplified will, nevertheless, be proportional to the original pressure drop within the primary means. Preserving such proportionality or line relationship of a predictable nature is of importance and is easily attainable in our improved system. This particular feature of our improved system is secured in a more reliable manner by virtue of decreasing the "parasitic volume" of the system. By virtue of the above described construction the "parasitic volume" in our improved system is decreased to a minimum. In one actual system constructed in accordance with the present invention the "parasitic volume" of the system is decreased to only 45 cubic centimeters. Such decrease, when compared with 350 cubic centimeters and 180 cubic centimeters of "parasitic volume" in two conventional systems now on the market, represents an improvement of particular value.

In order to provide for adjustments of sensitivity of the system in a precise manner a drum 58 is provided on the shaft of the sensitivity adjustment valve 55. The periphery of the drum 58 is graduated in desired units in order to indicate the degree of opening of the valve 55 and of the increase of sensitivity of the system corresponding to that particular opening as indicated by the graduations of the scale on said drum.

It will be understood that while in the above description reference was made to movements of the member 36 as affected by the change in pressure conditions within the system, such movements are very small and may not be visually perceptible. Coming of the system to a condition of force-balance is gradual and may not be accompanied by perceptible movements of its components, except by movements of the diaphragm 80. Changes within a period of time occur through infinitesimally small increments of time, and, therefore, when speaking of the entire period the use of the word "simultaneously" or "virtually simultaneously" may be more descriptive.

It will be understood further that the leak testing system described above includes a number of electric circuits adapted to operate various control components, such as those closing and opening various valves in synchronized sequence. These circuits, in turn, are controlled by various timing devices determining the duration of the test period. A suitable station for receiving a tested part, connecting and disconnecting the same from the system is also provided. However, such means per se do not form a part of the present invention, and their description and illustration would greatly overburden the present application presenting the danger of clouding the invention.

It will also be understood that our improved amplifier device may be regarded as a pneumatic amplifier-converter and that it may be used with success in applications other than leak testing systems, and particularly in various control systems as well as in measuring systems, including measuring flow, maintaining liquid levels, specific gravity and the like.

There is thus provided an improved leak testing system and an improved pneumatic amplifier with adjustable degree of sensitivity whereby the objects of the present invention and numerous additional advantages are attained.

We claim:

1. A pneumatic differential amplifying device adapted to respond to two signal pressures and thus to sense the difference therebetween and to produce modified pressure signal amplified in a predetermined degree in proportion to such sensed difference for the purpose of rendering said difference measurable for evaluation by measuring such amplified signal, said device comprising a housing; a bleed nozzle opening into said housing; a valve in said housing operatively associated with said nozzle for variably controlling flows therefrom; a stack of parallel diaphragm devices sealingly suspended at their peripheries by the housing to divide the housing into a plurality of expansible chambers, all of said diaphragm devices being connected at their middles forming a stack of unitary construction for simultaneous movement, said stack being operatively connected to the valve; first, second and third of said diaphragm devices having equal effective areas; a fourth of said diaphragm devices being located between said first and second diaphragm devices; and a fifth of said diaphragm devices being located between said second and third diaphragm devices; said fourth and fifth diaphragm devices having equal effective areas greater than the areas of the first three diaphragm devices; each of said diaphragm devices comprising a pair of parallel resilient diaphragm members vented to atmosphere therebetween; means directly connecting the chamber defined between the first and fourth diaphragm devices with a first source of pressure to exert a first force on said stack in a valve opening direction; means directly connecting the chamber defined between the fourth and second diaphragm device with a second source of pressure to exert a second force on the stack opposing said first force; pneumatic relay means having a fluid pressure inlet and an outlet and being operatively associated with said nozzle for producing an output pressure proportional to the pressure in said nozzle; passage means operatively connecting said output pressure with the chamber defined by said first diaphragm device and housing opposite the chamber defined by the first and fourth diaphragm devices to exert a force on said stack in the same direction as said first mentioned force; passage means including a variable restriction operatively connecting the output pressure of said relay with the chamber defined between the fifth and third diaphragm devices to exert a force on said stack opposing said first mentioned force; a restricted bleed passage connecting said last mentioned chamber to atmosphere; the chamber defined between the second and fifth diaphragm devices being connected to atmosphere.

2. The pneumatic differential amplifier defined in claim 1, with the fourth diaphragm device constituting the primary pressure-responsive means of the amplifier, with the means connecting the chambers at both sides of said fourth diaphragm device with the sources of the first and the second sources of pressure adapted to convey said pressures into said chambers unmodified except for parasitic influences, with said fifth diaphragm device constituting the secondary pressure responsive means of the amplifier and operating by exerting the force in the same direction as exerted by the primary pressure responsive means in order to amplify the response of said fourth diaphragm device.

3. The pneumatic amplifier device defined in claim 2, and including means manually adjustable to vary the restriction in the relay output pressure passage and thus to control the degree of amplification produceable by the fifth diaphragm device.

References Cited

UNITED STATES PATENTS

| | | | |
|---|---|---|---|
| 3,059,854 | 10/1962 | Fehlinger | 137—86 X |
| 3,181,547 | 5/1965 | Bennett | 137—82 |

ALAN COHAN, *Primary Examiner.*